Sept. 29, 1953

C. W. MALSTROM 2,653,590

INTERNAL-COMBUSTION ENGINE

Filed Nov. 24, 1950

INVENTOR.
Carl W. Malstrom
BY
Fishburn & Mullendore
ATTORNEYS

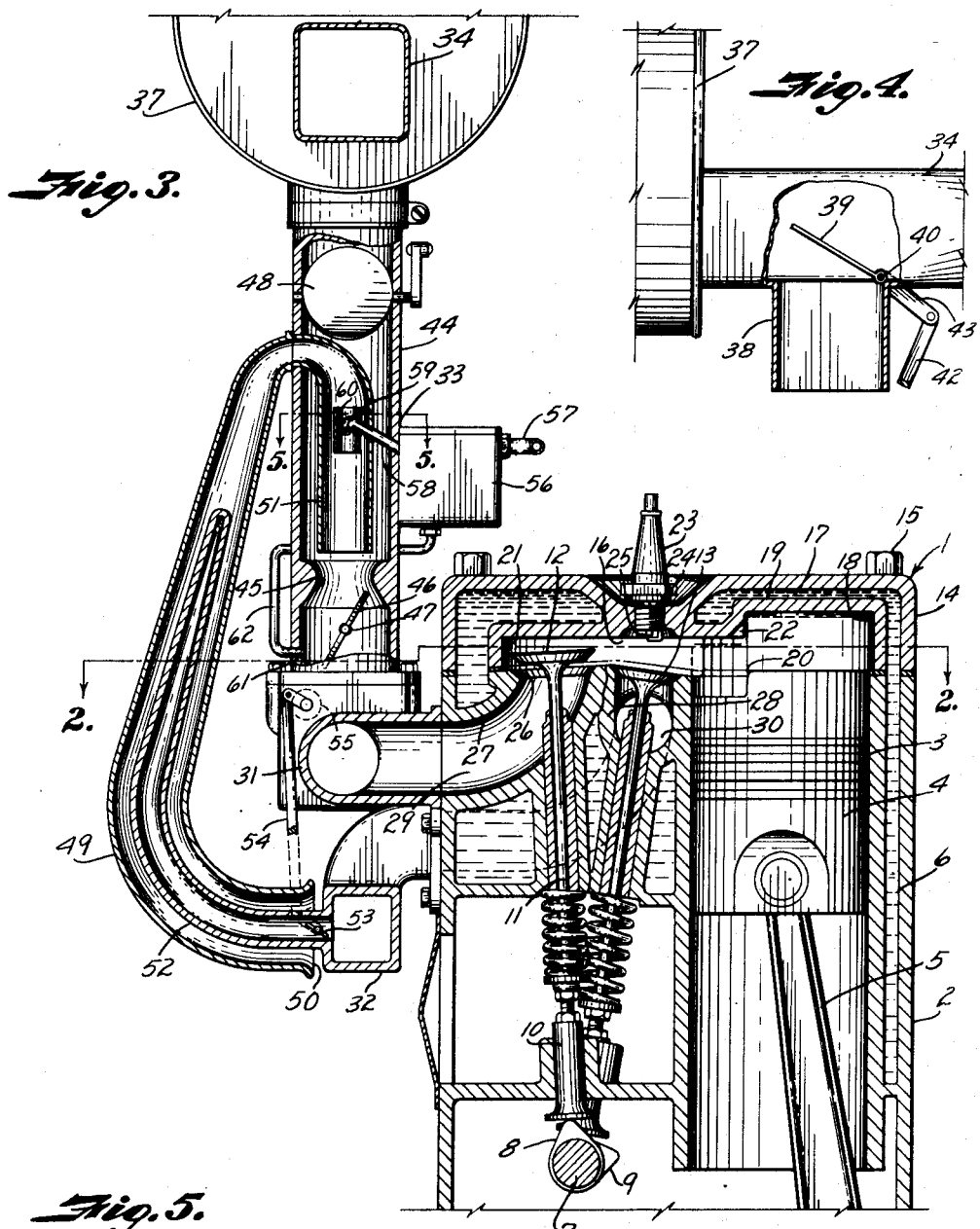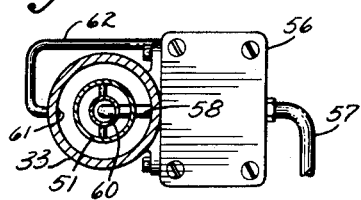

Sept. 29, 1953 C. W. MALSTROM 2,653,590
INTERNAL-COMBUSTION ENGINE
Filed Nov. 24, 1950 3 Sheets-Sheet 3

INVENTOR.
Carl W. Malstrom
BY
Fishburn & Mullendore
ATTORNEYS

Patented Sept. 29, 1953

2,653,590

UNITED STATES PATENT OFFICE 2,653,590

INTERNAL-COMBUSTION ENGINE

Carl W. Malstrom, Kansas City, Mo.

Application November 24, 1950, Serial No. 197,215

3 Claims. (Cl. 123—191)

This invention relates to internal combustion engines and more particularly to the control of the fuel delivery and combustion thereof in the combustion space, the form of the combustion space and arrangement of the valves and ignition means therein.

It is generally recognized that increased compression pressures are desirable in internal combustion engines, particularly those operating on gasoline mixtures to improve efficiency in performance. However, merely increasing the compression pressure usually results in preignition or detonation due to the difficulty in dissipating or cooling of high temperature areas in the combustion chamber. Also to secure best power output, the fuel charge in the combustion space must be ignited before the piston reaches top dead center because the combustion of a gaseous mixture is not instantaneous. However, if the ignition is such that there is a sudden increase in pressure approximately at the time the piston reaches top dead center there is a shock that is transmitted through the connecting rod to the crankshaft that is not effective in rotating the crank. It is the exertion of forces due to expanding gases as the connecting rod is assuming an increasing angle to the axis of the cylinder as the piston moves on its downward stroke that is effective in providing power delivered by the engine. Therefore elimination of shock, the provision for more efficient combustion and application of gaseous pressures to the piston are desirable.

The objects of the present invention are to generally improve engine performance and increase power output therefrom by providing combustion chamber construction and valve location therein for cooling of high temperature areas whereby higher compression pressures may be utilized without preignition; to provide a combustion chamber and piston arrangement and structure to substantially confine the compressed gaseous mixture being ignited until after the piston starts its downward stroke to eliminate excessive shocks on the piston connecting rod and crankshaft by gradually applying the increased pressure resulting from combustion of the gaseous mixture as a motivating force to the piston as the piston moves on its downward stroke; to provide a combustion chamber and valve arrangement therein relative to the cylinder for directing all of the cool intake gaseous mixture over the exhaust valve and igniting means for cooling same; to provide a cooler intake gaseous mixture for delivery to the combustion chamber by utilizing a relatively small stream of hot air to break up and/or atomize the liquid fuel and then mixing the hot gaseous fuel mixture with the principal portion of the required air which is relatively cool whereby the fuel mixture delivered to the combustion chamber is relatively cool but above a temperature at which the liquid fuel will condense therefrom; and to provide an internal combustion engine with a relatively cool gaseous fuel mixture in a controlled directional passage into the combustion chamber for cooling the high temperature areas thereof with a piston and combustion chamber arrangement for more efficiently burning the fuel and applying the expanding pressures therefrom to the piston whereby the fuel is burned more efficiently and cleaner without preignition for generally improved engine performance.

In accomplishing these and other objects of the present invention, I have provided improved details of structure, the preferred forms of which are illustrated in the accompanying drawings, wherein:

Fig. 3 is a vertical sectional view through the engine, particularly illustrating the arrangement and structure of the piston, valve and fuel system.

Fig. 4 is a partial elevation of the cool air intake and thermostatically controlled valve therefor, portions being broken away to better illustrate the structure.

Fig. 5 is a detail horizontal view through the fuel and air mixing device on the line 5—5, Fig. 3.

Figure 1:
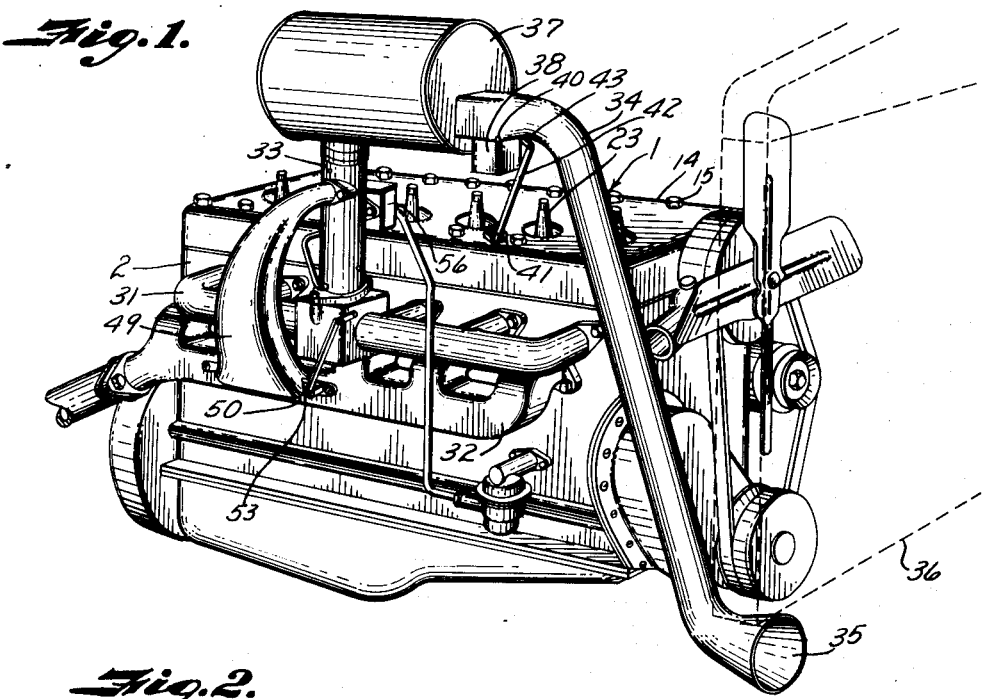
Fig. 1 is a perspective view of an engine particularly illustrating the arrangement of the air and fuel delivery system thereof.

Referring more in detail to the drawings:

1 designates an engine including a cylinder block 2 having a plurality of aligned cylinders 3 in which pistons 4 are operable, said pistons being adapted for connection with an engine crankshaft (not shown) in the usual manner by means of the usual connecting rod 5. The cylinder is preferably jacketed as at 6 for the purpose of circulating a cooling medium in conjunction with the cylinder. A cam shaft 7 is provided and supported in suitable bearings (not shown) carried by the cylinder block and including intake and exhaust cams 8 and 9 respectively, which cams are adapted to actuate the push rods 10 suitably connected to valve stems 11 of intake and exhaust valves 12 and 13 respectively.

The engine illustrated in Figs. 1 to 5 inclusive is of a type generally known as an L-head engine, in which type the valve structures are carried by the cylinder block for controlling the engine intake and exhaust located in the cylinder block at one side of the cylinders. A cylinder head structure 14 having a face complemental to the open cylinder ends is secured to the engine block in the usual manner by means of bolts 15 or the like and closes the outer open ends of the engine cylinders and extends over the portion of the cylinder block containing the valve structures. The cylinder head structure is provided with a plurality of combustion chambers 16, each co-operating with an engine cylinder in the customary manner. The cylinder head is jacketed as at 17, through which a cooling medium may be circulated for cooling the cylinder head structure, the cylinder head jacket 17 preferably being placed in communication with the cylinder jacket 6 in the usual manner. The cooling medium preferably is circulated under pressure through the cylinder jacket 6 and the cylinder head jacket 17, said cooling medium being preferably introduced into the cylinder head jacket as well as the cylinder jacket from a source of supply externally of the engine in the usual manner.

Figure 2:
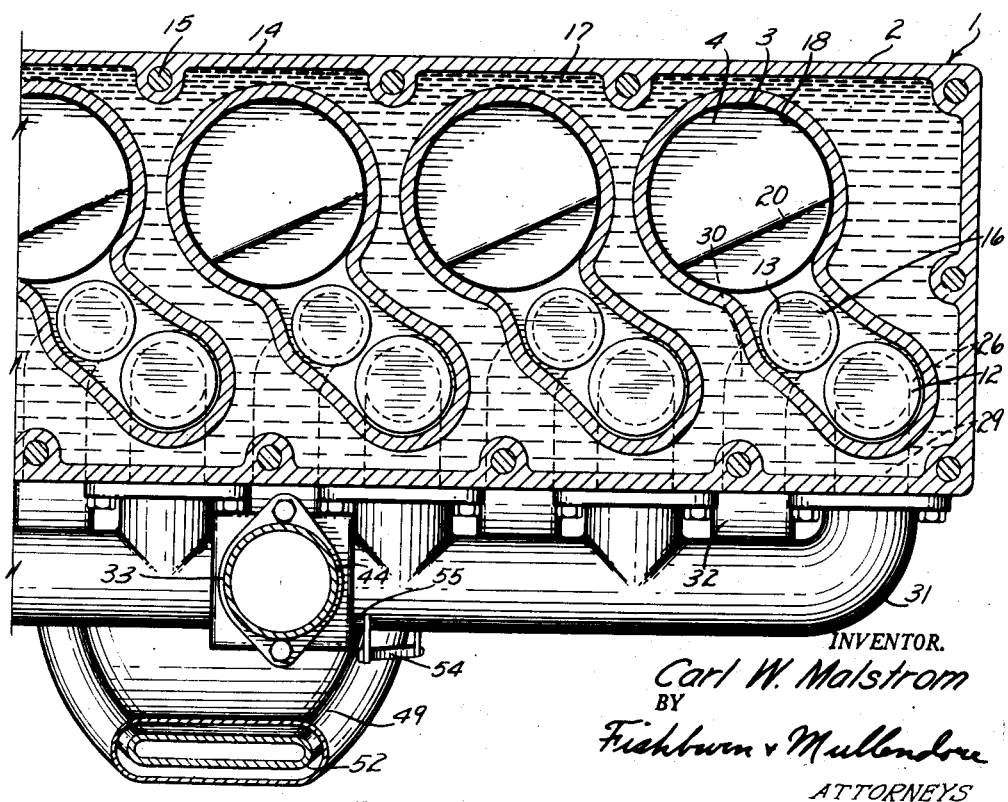
Fig. 2 is a horizontal sectional view through the engine on the line 2—2, Fig. 3.

The combustion chamber construction and shape are of special utility in connection with an engine having aligned cylinders, and may be incorporated with a multi-cylinder engine. Each combustion chamber in the cylinder head has a portion 18 which registers approximately with the cylinder bore and the wall 19 defining a portion 18 of the combustion chamber is substantially complementary to the shape of the upper end 20 of the piston 4 and is spaced upwardly in the cylinder head relatively to the piston travel and the stroke of the piston so arranged that when the piston is at the top dead center, as indicated in dotted lines in Fig. 3, there is only a small clearance between the piston and the wall 19 forming the portion 18 of the combustion chamber. In the structure illustrated in Fig. 3, the upper end 20 of the piston 4 is of step type, the portion remote from the valves extending further into the cylinder head. The portion of the wall 19 of the cylinder head immediately above the lower portion of the step in the piston is preferably substantially on a plane with a portion 21 of the combustion chamber which extends over the valves 12 and 13, the step portion of the wall 19 having a groove 22 therein to prevent trapping of gases in the portion 18 of the combustion chamber when the piston is moving upwardly to the top dead center position. The portion 21 of the combustion chamber preferably extends diagonally to the longitudinal cylinder axis plane of the engine and the sides of said combustion chamber portion are substantially parallel and have a spacing slightly greater than the diameter of the valves, said valves being in a line whereby one side of the portion 21 of each combustion chamber is substantially tangentially of the respective cylinder bore, as illustrated in Fig. 2.

The intake valve 12 is preferably the larger and spaced further from the cylinder, whereby all gaseous medium drawn into the cylinder through the intake valve must pass through the combustion chamber over and substantially in contact with the exhaust valve 13, and also must pass by the ignition means consisting of a sparkplug 23 threaded in an aperture 24 of the cylinder head whereby the points 25 of said sparkplug are adjacent and substantially above the exhaust valve 13. While the valves 12 and 13 for each cylinder are arranged at an angle to the longitudinal cylinder axis plane of the engine, they are also respectively arranged longitudinally of the engine whereby they are operated from a single cam shaft 7. This is accomplished by sloping the valves and valve stems 11 thereof at an angle relative to a vertical, longitudinal plane extending through the cam shaft 7 as shown in Fig. 3, whereby there is suitable spacing between the valve or valve seats 26 and walls 27 and 28 for defining intake passages 29 and exhaust passages 30 respectively in the cylinder block.

The angular arrangement of the valves and portion 21 of the combustion chambers relative to the respective cylinders is such that said portions 21 of the combustion chambers extend generally diagonally relative to longitudinal and transverse planes of the engine, said combustion chambers and valves preferably being uniformly arranged relative to the respective cylinders. With this arrangement, the portion 21 of the combustion chambers extends alongside of and in spaced relation to the next adjacent cylinder to provide what may be termed an overlapping or nesting arrangement for conserving the longitudinal length of the engine. This structure also provides an elongated combustion chamber structure which facilitates dissipation of excessive heat from the combustion chamber thereby aiding in maintaining a relatively cool condition in the combustion chamber during the compression stroke of the piston for reduction in tendency toward preignition or detonation.

The intake passages 29 from the several cylinders communicate with an intake manifold 31 which is suitably secured to the side of the cylinder block. The exhaust passage 30 of the several cylinders communicates with an exhaust manifold 32 which is also suitably secured to the side of the cylinder block. It is desirable that the fuel and air mixture delivered to the respective combustion chambers and cylinders be such that the fuel will be in vaporized condition and the mixture substantially as cool as possible without effecting condensation of the vaporized fuel in order to effect maximum cooling of the high temperature areas in the combustion chamber. In order to effect such fuel and air mixture, a fuel vaporizing or carbureting means 33 is connected to the intake manifold 31 for communication therethrough and the intake passages to the respective combustion chambers. The fuel vaporizing means is provided with an air intake preferably consisting of a duct 34 extending forwardly of the engine and having an inlet opening 35 to receive air that has not been heated by passing adjacent to the engine. For example, in an automobile engine the opening 35 would preferably be disposed alongside of or underneath a radiator indicated by dotted lines 36 in Fig. 1 for receiving air forwardly of said radiator. An air cleaner 37 is preferably interposed in the intake duct 34 adjacent the vaporizing device 33. The duct 34 is also preferably provided with a depending tubular portion 38 forwardly of and adjacent the air cleaner 37 for intake of air from adjacent the engine cylinder head to provide warmer air on cold days, particularly prior to the engine reaching a preferred operating temperature.

A swingable valve 39 is fixed to a shaft 40 suitably journalled for rotation in the air intake duct 34 and adapted to close said duct to prevent flow of cold air therein from the opening 35 whereby all intake air will be drawn through the tubular member or warm intake 38, and said valve may be swung to a position to open the duct 34 for flow of cold air from the intake opening 35 therethrough and to close the warm air intake 38. The valve 39 is preferably thermostatically controlled from a thermostat 41 suitably mounted on the engine or other position responsive to the operating temperatures thereof, for example on the cylinder head 14. The thermostat is connected by means of a link 42 with an arm 43 fixed to the shaft 40 whereby said thermostat will move the valve 39 to control the temperature of the air intake in accordance to the engine temperature.

The fuel vaporizing means 33 preferably consists of a tubular member 44 having its upper end communicating with the air cleaner 37 and its lower end communicating with the intake manifold 31, said tubular member having a reduced portion 45 in the bore thereof intermediate the air cleaner and manifold to form a venturi which is preferably immediately above a butterfly-type throttle valve 46, fixed on a shaft 47 and rotatably mounted in the tubular member immediately above the manifold 31. Adjacent the upper end of the tubular member 44 is a choke valve in the form of a butterfly valve 48 rotatably mounted in the tubular member 44 whereby said valve may be swung from vertical to horizontal position to effect a richer mixture delivered to the engine for starting and operation of the engine before it reaches a suitable operating temperature. The choke valve may be operated manually or thermostatically in the usual manner.

The fuel vaporizing device is provided with a heated air intake consisting of a duct 49 having an inlet opening 50 disposed adjacent to the exhaust manifold 32. The other end of the duct 49 is secured to the tubular member 44 and has communication with the upper end of a hot air discharge tube disposed within the tubular member 44, said discharge tube 51 having a portion arranged substantially concentric of the tubular member 44 and terminating in an open lower end immediately above the reduced bore 45 where the warm air is mixed with cold air drawn through the intake duct 34 and through the tubular member 44 around the discharge tube 51. Air passing through the duct 49 is heated by a hot spot chamber 52 connected to the exhaust manifold 32 and extending therefrom into the duct 49 for a substantial portion of the length thereof. The walls of the hot spot chamber are spaced from the walls of the duct 49 whereby air drawn through the duct passes between said walls in such a manner as to be heated by the hot spot chamber.

The hot spot chamber 52 is hollow and movement of heated exhaust gases therein is controlled by a butterfly type of valve 53 located in the chamber adjacent the exhaust manifold, said valve being connected by a link 54 with a thermostat 55 located in the intake manifold 31 whereby the heat delivered to the hot spot chamber is controlled responsive to the temperature of the intake mixture in the intake manifold.

Arranged on one side of the tubular member 44 is a fuel float chamber 56 suitably connected by a fuel pipe 57 to a source of fuel supply. A fuel delivery tube 58 extends from the float chamber into the fuel vaporizing device and terminates in a downwardly directed jet end 59 in the discharge tube 51. A cylindrical tube 60 surrounds the jet end 59 to provide a Venturi effect whereby the hot air mixes with the fuel delivered through the jet end 59, breaking up and/or vaporizing same. However, it is to be noted that the smaller portion of the total intake air is heated and is used in the preliminary stage of effecting vaporization of the fuel. Then the hot air and fuel vapors are mixed with the cold air at the venturi 45 with the result that the total intake mixture includes vaporized fuel, but is at as low a temperature as is possible without permitting the fuel to condense therefrom. It is also to be noted that the intake manifold is not in heat transfer relation with the exhaust manifold so that the intake mixture is not heated in its passage through said intake manifold, thereby providing a cool mixture that is delivered to the combustion chamber and respective cylinders.

An idle jet 61 extends into the tubular member 44 below the throttle valve 46, said idle jet having connection by a tube 62 with the float chamber 56 to provide fuel for operation of the engine at idle speeds when the throttle valve 46 is substantially in closed position.

In operating an engine constructed as described, as when starting cold, the valve 39 would be in position to close flow through the intake duct 34. Then by turning on the ignition and turning the crankshaft to reciprocate the pistons, the intake stroke of the respective pistons draws air through the member 38, air cleaner 37 and into the fuel vaporizing device. Air also is drawn through the inlet opening 50, duct 49 and discharge tube 51. Fuel is drawn from the float chamber 56 through the jet 59. The fuel and air mixture as controlled by the throttle valve 46 is drawn through the intake manifold 31, intake passage 29, into the combustion chamber 16, the intake mixture passing over the exhaust valve 13 and under the ignition device 25. As the piston starts its upward compression stroke, the valve 12 is closed and the air and fuel mixture compressed in the portion of the combustion chamber 21. The igniting device effects ignition of the fuel and air mixture while it is compressed in the portion 21 of the combustion chamber, it being noted that the side of the piston substantially closes the communication between the portion 21 of the combustion chamber when said piston is at the upper end of its stroke.

As the piston moves on its downward stroke or power stroke, the increase in pressure effected by the combustion of the fuel and air is applied to the upper end of the piston to force same downwardly. The particular arrangement of the combustion chamber retains the burning gases in the portion 21 of the combustion chamber for a portion of the stroke to effect more complete burning of the fuel so that the high burning pressures are gradually applied and act on the piston during its power stroke and not a shock from sudden ignition that is transmitted immediately over the piston. The step construction of the piston and combustion chamber also increases turbulence and tendency toward complete burning of the fuel. As the engine becomes warm, the valve 39 is moved by the thermostat 41 to close the flow through the member 38 so that cold air is drawn through the intake duct 34. Also the hot exhaust gases passing through the exhaust manifold heat the hot spot chamber 52, thereby heating the air passing through the duct 49 thereby delivering hot air through the venturi 16 for mixture with the fuel from the jet 59, said hot air mixing with the cool air from the intake duct 34 at the venturi 45. As the intake mixture is heated the thermostat 55 acts to move the valve 54 to control the movement of exhaust gas into the hot spot chamber 52, thereby regulating the temperature of the air delivered by the duct 49.

Operation of the engine and exhaust of the burned gases from the cylinder and combustion chamber through the passage 30 heats the exhaust valve and also the lower end of the igniting device. However, these high temperature areas are cooled each time a new charge of fuel and air is drawn through the intake valve and the intake mixture must pass in intimate contact with the exhaust valve 13 and igniting device. The angular arrangement of the combustion chamber causes the intake mixture to move into the cylinder and effect a spiral therein, increasing turbulence which results in more complete burning of the fuel charge.

Figure 6:
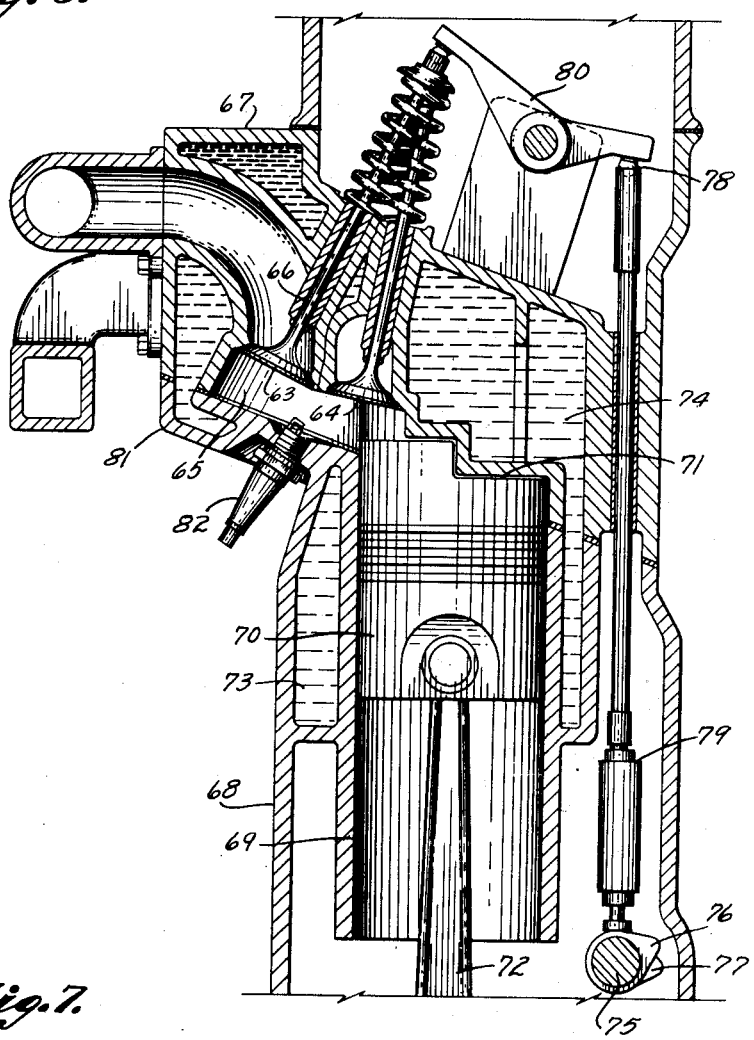
Fig. 6 is a vertical sectional view through a modified form of engine with a valve-in-head arrangement.
Figure 7:
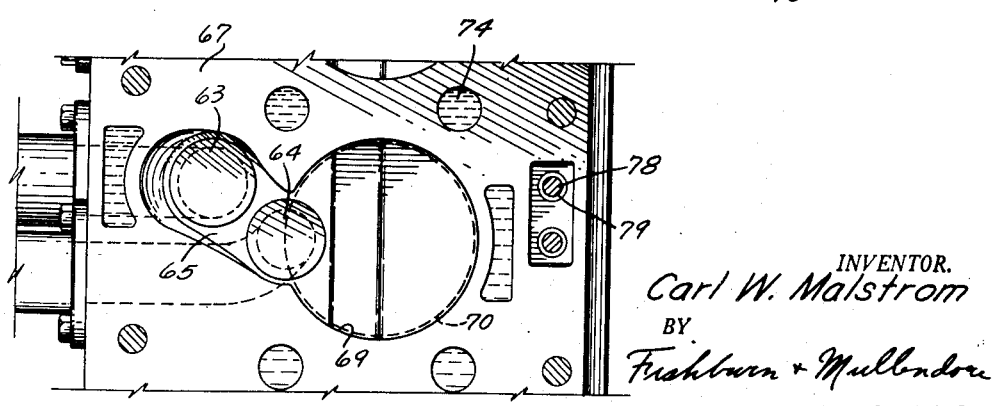
Fig. 7 is a fragmentary bottom plan view of the cylinder head of the modified form of engine shown in Fig. 6.

In the form of the invention illustrated in Figs. 6 and 7, the intake valve 63 and exhaust valve 64 are located in the combustion chamber 65 and have stems 66 slidably mounted in the cylinder head 67, which is mounted on the upper end of a cylinder block 68 in position to close the upper end of the cylinder 69. A piston 70 preferably having a step-type upper end 71 operates in the cylinder 69 and is connected by a connecting rod 72 with a crankshaft (not shown). The cylinder and cylinder head are jacketed as at 73 and 74 respectively for circulation of cooling medium to dissipate some of the heat from the engine. Suitably mounted in the cylinder block is a cam shaft 75, having cams 76 and 77 for actuating valve operating mechanism 78, which includes push rods 79 and rocker arms 80 in the usual manner. The cylinder head 67 extends over and engages a laterally extending flange-like portion 81 at the upper end of the cylinder block whereby the portion 81 closes the combustion chamber 65 in said cylinder head. The combustion chamber is elongated and at an angle to the longitudinal plane of the engine and the valves 63 and 64 are located in the combustion chamber substantially in a line whereby all of the intake mixture must pass under the exhaust valve 64 and over the ignition device 82 to cool same, said ignition device being mounted in the flange-like portion 81 and having points extending into the combustion chamber.

Primarily the structure shown in Figs. 6 and 7 has a combustion chamber offset from the cylinder similarly to the arrangement of the combustion chamber shown in Fig. 2, but with the valves in the cylinder head. The operation of the modified form of engine is substantially the same as the operation of the engine shown in Figs. 1 to 5 inclusive, the intake gas cooling the high temperature areas in the combustion chamber and the step construction of the piston and combustion chamber and the annular arrangement of the combustion chamber providing turbulence to aid in effecting complete combustion of the fuel.

Although there has been described and illustrated specific forms of my invention adapted particularly for L-head and valve-in-head engines, the invention as explained may be embodied in different forms of such structure and it will be understood that the scope of the invention is not limited to the exemplary structure illustrated and specifically described.

What I claim and desire to secure by Letters Patent is:

1. In an internal combustion engine having a plurality of aligned cylinders, a cylinder head structure closing the outer open ends of said cylinders, said cylinder head structure being provided with a plurality of recesses constituting combustion chambers, each combustion chamber being divided into portions of different height above said open ends of the cylinders with the roof portion over the cylinder of the greater height, the portions of the chambers having lower height being to one side of the cylinders and having sides substantially parallel and extending diagonally to the longitudinal cylinder axis plane, a piston reciprocable in each cylinder and movable into close proximity to the roof of the combustion chamber over the respective cylinder at the end of the compression stroke to substantially confine the fuel charge in the portion of the combustion chamber of lesser height and extending from the cylinder, and inlet and exhaust valves in each combustion chamber portion of lesser height and arranged in a line substantially parallel to the sides of the chambers with the exhaust valves spaced from the cylinders and between the inlet valves and cylinders whereby intake mixtures sweep the exhaust valves to cool same.

2. In an internal combustion engine having a plurality of aligned cylinders, a cylinder head structure closing the outer open ends of said cylinders, said cylinder head structure being provided with a face complemental to said open cylinder ends with a plurality of recesses constituting combustion chambers, each combustion chamber being divided into portions of different height above said open ends of the cylinders with the roof portion over the cylinder of the greater height, the portions of the chambers having lower height being to one side of the cylinders and elongated and having sides substantially parallel and extending diagonally to the longitudinal cylinder axis plane, one of said parallel sides of each combustion chamber being substantially tangentially of the respective cylinder, a piston reciprocable in each cylinder and movable into close proximity to the roof of the combustion chamber over the respective cylinder at the end of the compression stroke to substantially confine the fuel charge in the portion of the combustion chamber of lesser height and extending from the cylinder, inlet and exhaust valves in each combustion chamber portion of lesser height and arranged in a line substantially parallel to the sides of the chambers with the exhaust valves spaced from the cylinders and between the inlet valves and cylinders, and an ignition device extending into and disposed in each combustion chamber adjacent the respective exhaust valves whereby intake mixtures sweep the exhaust valves and ignition devices to cool same.

3. In an internal combustion engine having a plurality of aligned cylinders, a cylinder head structure closing the outer open ends of said cylinders, said cylinder head structure being provided with a face complemental to the open cylinder ends with a plurality of recesses constituting combustion chambers, each combustion chamber having portions of different height with the roof portion over the cylinder in a series of steps, said combustion chambers having elongated portions to one side of the cylinders with sides substantially parallel and extending diagonally to the longitudinal cylinder axis plane, one of said parallel sides of each combustion chamber being substantially tangentially of the respective cylinder, a piston reciprocable in each cylinder and having a step shaped top complementary to the steps of the roof of the portion of the combustion chamber over the respective cylinder, said piston being movable into close proximity to the roof of the combustion chamber over the cylinder at the end of the compression stroke to substantially confine the fuel charge in the portion of the combustion chamber extending from the cylinder, inlet and exhaust valves in each of said extending portion of the combustion chamber in a line substantially parallel to the sides of said combustion chamber portion with the exhaust valves spaced from the cylinders and between the inlet valves and cylinders, and an ignition device extending into and disposed in each combustion chamber adjacent the respective exhaust valves whereby intake fuel mixtures sweep the exhaust valves and ignition device to cool same, said ignition devices igniting the fuel mixtures when substantially confined in the extending portions of the combustion chambers whereby substantial burning of said fuel mixture is accomplished before the confining portion of the piston and steps thereof move on the power stroke to completely open said extending portion of the combustion chamber for application of the full effect of the increased pressures resulting from said burning on the pistons.

CARL W. MALSTROM.

References Cited in the file of this patent

UNITED STATES PATENTS

| Number | Name | Date |
|---|---|---|
| 1,209,389 | Brown | Dec. 19, 1916 |
| 1,839,560 | Kalb | Jan. 5, 1932 |
| 2,282,435 | Swaine | May 12, 1942 |
| 2,522,921 | Barkeij | Sept. 19, 1950 |
| 2,563,939 | Kishline | Aug. 14, 1951 |
| 2,565,068 | Drabold | Aug. 21, 1951 |